A. I. MASON.
BOX PRESS.
APPLICATION FILED APR. 8, 1911.

1,015,237.

Patented Jan. 16, 1912.
2 SHEETS—SHEET 1.

WITNESSES:
Cecil Long
W. Lewis Coop.

INVENTOR
Albert I. Mason
BY
ATTORNEY

A. I. MASON.
BOX PRESS.
APPLICATION FILED APR. 8, 1911.

1,015,237.

Patented Jan. 16, 1912.
2 SHEETS—SHEET 2.

WITNESSES:
Cecil Long
W. Lewis Coop.

INVENTOR
Albert I. Mason
BY
F. J. Geisler
ATTORNEY

UNITED STATES PATENT OFFICE.

ALBERT I. MASON, OF HOOD RIVER, OREGON.

BOX-PRESS.

1,015,237.  Specification of Letters Patent.  Patented Jan. 16, 1912.

Application filed April 8, 1911. Serial No. 619,854.

*To all whom it may concern:*

Be it known that I, ALBERT I. MASON, a citizen of the United States, and a resident of Hood River, county of Hood River, State of Oregon, have invented a new and useful Improvement in Box-Presses, of which the following is a specification.

My invention relates more particularly to fruit boxes of the type having a top which, when secured in place, is arched over a bar transverse on the top of the box, so as to prevent crushing of the fruit at the top of the box, and also to provide ample space for ventilation.

My invention has for its object the providing a mechanical device for pressing down and holding the box top in place while nailing its ends onto the top of the box.

Figure 1:
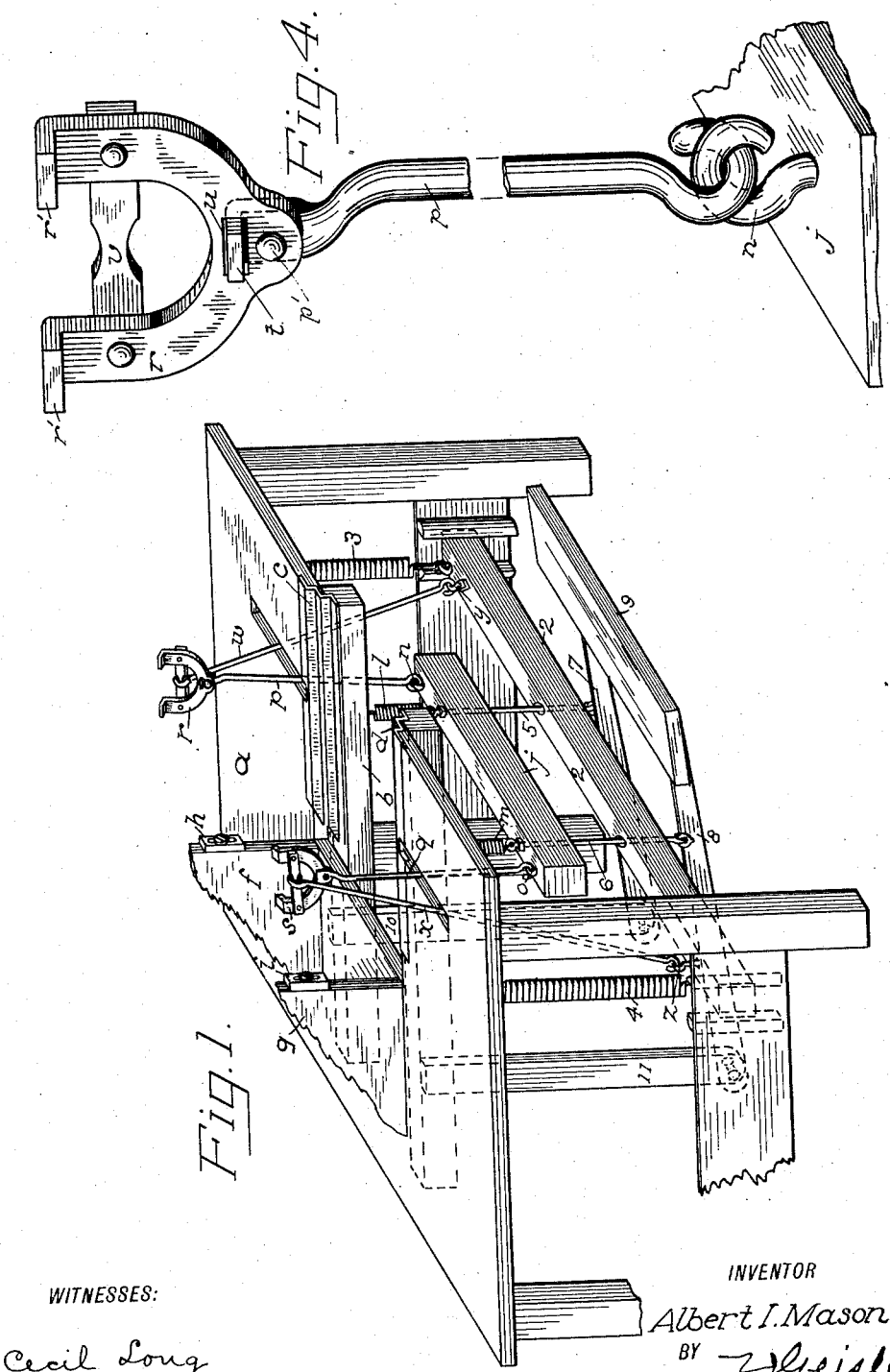
Figure 2:
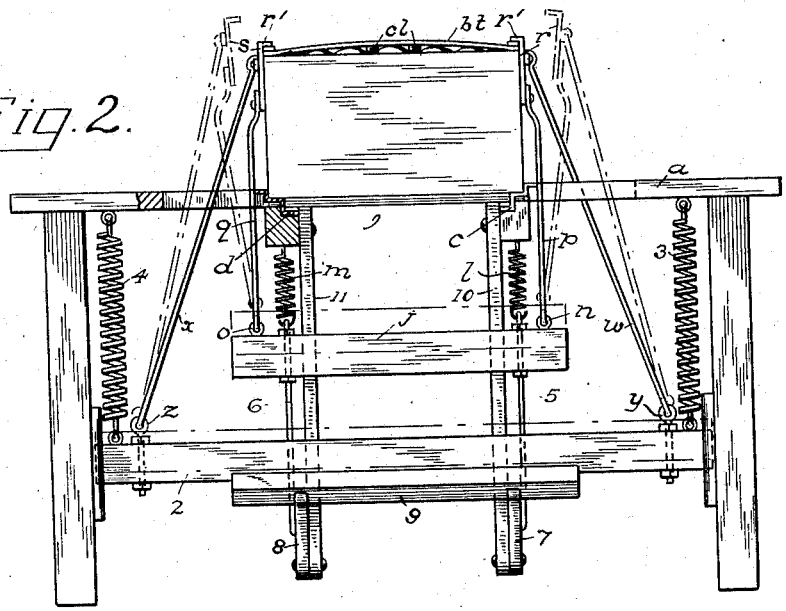
Figure 3:
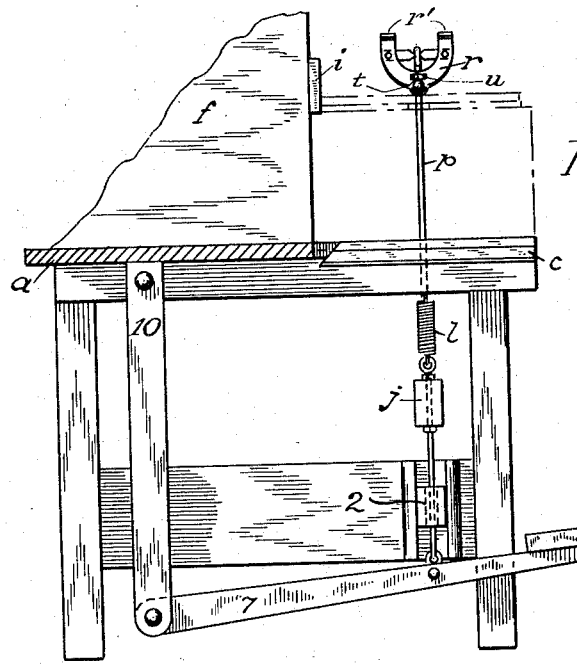
Figure 5:
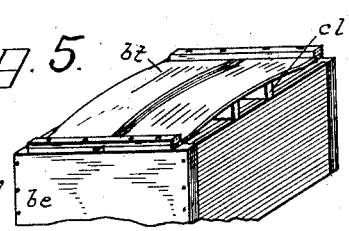

I attain my general object, and the features incidental thereto, hereinafter fully described, in the machine illustrated in the accompanying drawings, in which:

Figure 1 is a general perspective, end elevation of my machine with parts broken away; Fig. 2 is a front elevation of my machine, also illustrating the mode of its operation in bending down the ends of the box top, so that they may be nailed onto the top of the ends of the box; Fig. 3 is a vertical cross section taken approximately through the center of Fig. 2; Fig. 4 is a perspective detail of one of the grapples of my device, which seize the ends of the box top and force it down on the top of the box ends; and Fig. 5 illustrates the particular type of box to which my device relates.

The table, $a$, is cut away at $b$, and provided with cleats, $c$, $d$, at the sides of such cut-out portion, and such cleats serve as a seat for guiding the placing of the fruit box, as shown in Fig. 2. On the table are rigidly mounted standards, $f$, $g$, against the perpendicular front faces of which is placed the rear side of the boxes, as illustrated in Fig. 3. The cleats, $c$, $d$, and uprights, $f$, $g$, constitute, in short, a placing-frame for properly setting the box on the table and holding it in place while putting on its top, as mentioned. The standards, $f$, $g$, are made with projections, $h$, $i$, which serve to guide the proper placing of the box top, $bt$, on the box ends, $be$, so as to leave air spaces at both sides of the box. See Figs. 2 and 5.

From the bottom of the table is suspended, by contraction coil springs, $l$, $m$, a bar $j$. The latter is provided with eye bolts $n$, $o$ with which are engaged the bottom hooked ends of the rods $p$, $q$, to the upper ends of which are pivotally fastened the grapples $r$, $s$, the upper extremities of which are formed with claws, $r'$, $r'$, as more clearly shown in Fig. 4. The grapples, $r$, $s$, are preferably made bifurcated, and in order to limit their rocking motion on the rods, $p$, $q$, each of the latter is made with a bent portion at its upper extremity, like at $t$ in Fig. 4, projecting through a slot $u$ therefor provided in the grapple just above its pivot $p'$.

To each of the grapples is secured a cross member $v$, on which are fastened the upper ends of links, $w$, $x$, the lower ends of which are fastened to eye bolts $z$, $y$, on the bar 2, which is suspended from the bottom of the table, $a$, by contraction coil-springs 3, 4. Secured pendent to the bar $j$ are rods 5, 6, which are guided in the vertical cavities therefor provided in the bar 2, and the lower ends of such rods are fastened to the arms 7, 8 of a treadle 9, pivoting on the arms 10, 11, dependent from the table $a$. The contraction coil springs, $l$, $m$, normally pull the bar $j$ up, and since the rods, $p$, $q$, are fastened at their lower ends to the bar $j$ and at their upper ends to the rods $w$, $x$, the up movement of the bar $j$ causes the grapples to be normally moved outward, that is to say, positioned as illustrated by dotted outline in Fig. 2. The contraction springs 3, 4, suspend the bar 2 in its normal position and permit it to yield to and move down with the bar $j$ when engaged thereby.

When the box has been set in the placing frame, as shown in Figs. 2 and 3, the box top is then laid over the top of the box, the rear side of the top being set against the projections $h$, $i$ on the standards, $f$, $g$, as mentioned. The normal position of the grapples, $r$, $s$, is shown in dotted outline in Fig. 2. When the operator then depresses the treadle 9 with his foot, the grapples, $r$, $s$, are caused to seize the ends of the box-top and pull it down onto the top of the box-ends, as illustrated in Fig. 2, in so doing bending the box-top across the cleats $cl$. The bent portions or claws $r'$, $r'$ at the upper extremities of the grapples $r$, $s$ are very narrow, so as to cover very little of the ends of the box-top, and not to interfere with the placing of sufficient nails for securing said ends in place. By reason of the grapples, $r$, $s$, being pivotally connected to the rods, $p$, $q$, they are able to accommodate themselves to and get a better grip on the surface of the box-top ends, while forcing the latter down on the top of the box-ends. When the box-top has been nailed in place, by releasing the treadle, the grapples, $r$, $s$, will again assume the position thereof shown in dotted outline in Fig. 2, thus releasing the box.

The rods $p$, $q$ and $w$, $x$ work in longitudinal slots in the top of the table. The springs $l$, $m$ are made of sufficient strength to hold the treadle uplifted.

I claim:

1. A box press comprising a table, a frame mounted thereon for seating a box in place, and means, also mounted on the table, for guiding the placing in position of the box-top on the box; a bar and coil-springs pendently supporting it under the table, rods hinged to the bar and grapples pivoted to the upper ends of such rods, said grapples provided with claws at their extremities; a treadle pivoted under the table, and connections between the treadle and said bar; means for normally holding the grapples outward in their inactive position and moving them inward upon the depression of the treadle.

2. A box press comprising a table, a frame mounted thereon for seating a box in place, and means, also mounted on the table, for guiding the placing in position of the box-top on the box; a bar and coil-springs pendently supporting it under the table, rods hinged to the bar and bifurcated grapples pivoted to the upper ends of such rods, said grapples provided with claws at their extremities; a treadle pivoted under the table, and connections between the treadle and said bar; means for normally holding the grapples outward in their inactive position and moving them inward upon the depression of the treadle.

3. A box press comprising a table, a frame mounted thereon for seating a box in place, and means, also mounted on the table, for guiding the placing in position of the box-top on the box; a bar and coil-springs pendently supporting it under the table, rods hinged to the bar and grapples pivoted to the upper ends of such rods, said grapples provided with claws at their extremities; a treadle pivoted under the table, and connections between the treadle and said bar; a second bar between the first mentioned bar and the treadle, and coil-springs suspending such second bar pendent from the table; links connecting the grapples with said second bar; the table top being provided with slots for said rods and links to work in; the devices controlling the operation of the grapples being adapted to cause the latter to stand normally outward and to be moved inward upon the depression of the treadle.

4. A box press comprising a table, a frame mounted thereon for seating a box in place, and means, also mounted on the table, for guiding the placing in position of the box-top on the box; a bar and coil-springs pendently supporting it under the table, rods hinged to the bar and bifurcated grapples pivoted to the upper ends of such rods, said grapples provided with claws at their extremities; a treadle pivoted under the table, and connections between the treadle and said bar; a second bar between the first mentioned bar and the treadle, and coil-springs suspending such second bar pendent from the table; links connecting the grapples with said second bar; the table top being provided with slots for said rods and links to work in; the devices controlling the operation of the grapples being adapted to cause the latter to stand normally outward and to be moved inward upon the depression of the treadle.

5. A box press comprising a table, cleats on the table for guiding the placing of a box in position, standards on the table and projections on the upper ends of the standards for guiding the placing in position of the box and the top thereon; grapples and operating means therefor including a treadle, such operating means adapted to position the grapples normally out of contact with the ends of the box top and upon depression of the treadle to cause them to seize and bear down upon such ends; a bar and coil-springs pendently supporting it under the table, rods hinged to the bar and bifurcated grapples pivoted to the upper ends of such rods, said grapples provided with claws at their extremities; a treadle pivoted under the table, and connections between the treadle and said bar; a second bar between the first mentioned bar and the treadle, and coil-springs suspending such second bar pendent from the table; links connecting the grapples with said second bar; the table top being provided with slots for said rods and links to work in; the devices controlling the operation of the grapples being adapted to cause the latter to stand normally outward and to be moved inward upon the depression of the treadle.

ALBERT I. MASON.

Witnesses:
 CECIL LONG,
 O. O. MARTIN.

Copies of this patent may be obtained for five cents each, by addressing the "Commissioner of Patents, Washington, D. C."